United States Patent [15] 3,641,974
Yamada et al. [45] Feb. 15, 1972

[54] APPARATUS FOR FORMING FILMS

[72] Inventors: Eiichi Yamada; Yoshiteru Arakawa; Masayuki Yamamoto; Hiroto Nagatomo, all of Tokyo, Japan

[73] Assignee: Hitachi, Ltd., Tokyo, Japan

[22] Filed: Aug. 28, 1970

[21] Appl. No.: 67,879

[30] Foreign Application Priority Data

Aug. 29, 1969 Japan....................................44/68031

[52] U.S. Cl.................................................................118/48
[51] Int. Cl..........................................................C23c 11/00
[58] Field of Search..........................................118/48–49.5; 148/174, 175; 117/107.1

[56] References Cited

UNITED STATES PATENTS

| | | | |
|---|---|---|---|
| 3,464,846 | 9/1969 | Mattson | 118/48 X |
| 3,473,954 | 10/1969 | Mattson | 118/48 X |

*Primary Examiner*—Morris Kaplan
*Attorney*—Craig, Antonelli and Hill

[57] ABSTRACT

The present disclosure is directed to an apparatus for forming a film on a wafer which comprises a container means adapted to be hermetically sealed, a shaft means disposed for rotation in said container means, a first and second plate means fixed to said shaft means in a spaced-apart relationship, said first plate means adapted to support said wafer and pipe means for introducing a reaction gas into the container means, one end portion of said pipe means being placed between the first and second plate means.

15 Claims, 7 Drawing Figures

INVENTORS
EIICHI YAMADA, YOSHITERU ARAKAWA, MASAYUKI YAMAMOTO
AND HIROTO NAGATOMO
BY
Craig, Antonelli, Stewart & Hill
ATTORNEYS INVENTORS
EIICHI YAMADA, YOSHITERU ARAKAWA, MASAYUKI YAMAMOTO
AND HIROTO NAGATOMO
BY
Craig, Antonelli, Stewart & Hill
ATTORNEYS INVENTORS
EIICHI YAMADA, YOSHITERU ARAKAWA, MASAYUKI YAMAMOTO
AND HIROTO NAGATOMO
BY
Craig, Antonelli, Stewart + Hill
ATTORNEYS

APPARATUS FOR FORMING FILMS

BACKGROUND OF THE INVENTION

This invention relates to an apparatus for forming films, especially, to an apparatus wherein films are formed by the chemical gas phase reaction or chemical vapor deposition.

Generally, in a semiconductor device it is important to make the thickness of a film formed on the surface of a semiconductor element uniform for passivating the surface thereof, since the thickness of the film has a sensitive influence on the electric characteristics of the semiconductor device. Especially, in the case of forming a silicon nitride film, to which attention has been recently paid, the forming speed or the growing speed thereof is very sensitively influenced by the forming condition of the apparatus because the film is chemically grown from a gas phase. As an apparatus for forming the silicon nitride film on the surface of a semiconductor element, a hermetically sealed bath having a globular shaped top, for example, a so-called bell jar, has been used. A semiconductor wafer is disposed in the bell jar and a reaction gas is provided while the wafer is heated. The forming or growing speed of the silicon nitride film is greatly changed by the flowing velocity of the reaction gas and the temperature difference in the bell jar.

However, in the above-mentioned apparatus, convection of the reaction gas occurs due to the temperature difference created in the bell jar. Thus, the thickness of the silicon nitride film formed on the surface of the semiconductor wafer is not uniform at all parts of the wafer. In other words, portions in which the chemical reaction in the gas phase readily occurs and portions in which the same does not readily occur are made in a wafer by the convection of the above-mentioned reaction gas. Semiconductor devices, wherein a surface passivating film of silicon nitride is formed by the above-mentioned apparatus, have therefore lacked uniformity in their electric characteristics.

SUMMARY OF THE INVENTION

It is an object of the present invention to provide an apparatus for forming films with a uniform thickness.

It is another object of the present invention to provide a uniform temperature at a predetermined portion in the bell jar, for forming the film by a gas phase reaction.

It is a further object of the present invention to form an insulating film consisting essentially of silicon nitride with a substantially uniform thickness, on a semiconductor elements.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention comprises an apparatus for forming films with a substantially uniform thickness wherein a substantially flat plate is provided above the jig on which semiconductor wafers are disposed, to eliminate the temperature differences which can exist around the wafer. The nonuniformity in the film thickness caused by the convection of the reaction gas is thus removed.

According to the present invention, a substantially flat plate is provided above the jig, whereby the range of the space in which the heat for heating the jig is substantially reduced and furthermore the heat is reflected by the plate to maintain the temperature between the jig and the plate at a constance value. Since the temperature difference is increased as the distance from the heating source is increased, the flat plate should be provided near the heating source to reduce the thermal transfer range. Also, it is desirable that the size of the plate provided above the jig is almost the same as the jig, or more desirably, a little larger than the jig. According to the film forming apparatus having the above-mentioned structure, since the bad influence due to convection is removed, the film is formed with an even thickness. According to the present invention a silicon nitride film, in which the ratio of the difference between the maximum thickness and the minimum thickness to the maximum thickness is in the range of about 5 to 10 percent, is obtained on a semiconductor element. This is directed to the reliability and uniformity of the electric characteristics of semiconductor devices wherein the semiconductor element with the above-mentioned film having a uniform thickness is used. In other words, the electric characteristics of the products in a wafer or among the wafers or lots of wafers are stabilized and made uniform.

DESCRIPTION OF THE DRAWINGS

The present invention will become more fully understood from the detailed description given hereinbelow and the accompanying drawings which are given by way of illustration only and thus are not limitative of the present invention and wherein.

FIG. 1 is a partial sectional view of a film forming apparatus according to the present invention. Numeral 11 shows semiconductor wafers of silicon and 12 is a bell jar of quartz with a globular shaped top. Also, 13 is a turn table jig or a disk plate of carbon on which the semiconductor wafers 11 are disposed. The plate 13 may be coated with a silicon carbide layer. Also, 15 is a coil for radio-heating the plate 13, 16 is a shaft of the plate 13 and 17 is an injection pipe or a conduit pipe through which the reaction gas is introduced into the bell jar. Furthermore 14 is a substantially flat plate or a disk characterized by being made of the same material as the plate 13, provided thereunder. The end portion of the injection pipe 17 is placed between the plates 13 and 14. In the above-mentioned structure, since the upper surface of the wafer 11 is heated to an elevated temperature by the plates 13 and 14 and the temperature between the plate 13 and the flat plate 14 is kept almost at a constant value, the thermal convection due to the reaction gas is removed and the film forming condition becomes uniform on every portion of the wafer. Thereby the film is formed with even thickness. Also, since the bad influence due to convection is removed from every portion of the plate 13, the difference of the thickness of the films among wafers is removed. It is desired that the space between the plates 13 and 14 is made as narrow as possible to keep the temperature at a constant value. As is clear from the drawing, the flat plate 14 is almost the same size as the plate 13, or a little larger. The temperature generated by the heat from the heating part is maintained constant over the whole area near the plate 13.

Figure 1:
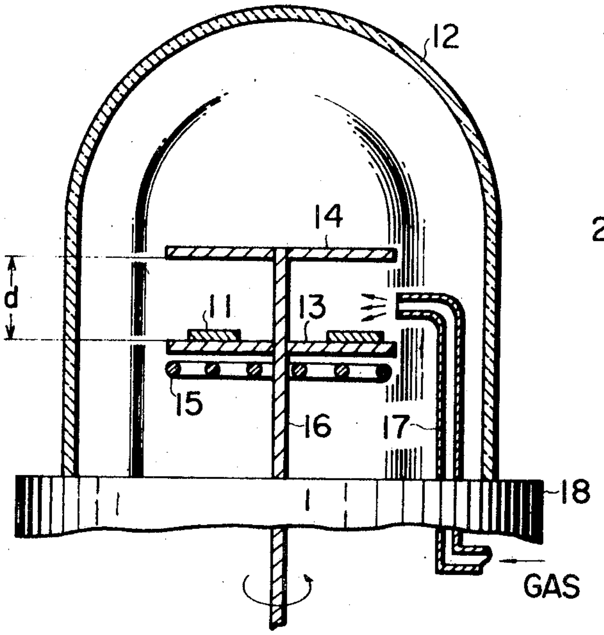
FIG. 1 is a sectional view of an apparatus for forming films according to the present invention.

If the surface of the wafer to be disposed on the flat plate 13 is not even, so that the wafer does not completely contact the surface of plate 13, some portions of the wafer cannot be heated to certain elevated temperatures without using the above-mentioned apparatus. According to the present apparatus, such unheated portions of the wafer can be heated to a certain elevated temperature by heat radiated from the upper plate 14. Therebefore, it will be understood that uneven wafers can also be treated using the apparatus of the present invention.

A process for forming an insulating film consisting essentially of silicon nitride will be explained hereinafter, and should not be considered as limiting.

EXAMPLE

The disk plate 13 having about 5 mm. thickness and about 17 cm. diameter and the disk plate 14 having about 5 mm. thickness and about 19 cm. diameter are prepared. The plate 14 is fixed to the shaft 16 at a position extended from the plate 13 by 4 cm. Silicon wafers having a thickness of about 200$\mu$ are disposed on the plate 13, and the plate 13 is heated to an elevated temperature of about 850° C. by the radio-heating coil 5. The plate 14 is also heated to about 600° C. The shaft 16 is slowly turned with a revolution speed of about 10 turns/min., and then a reaction gas containing nitrogen $N_2$ as the carrier gas at 20 liters/min., a silicon compound, for example, monosilane $SiH_4$ at 12 cc./min. and ammonia $NH_3$, at 360 cc./min. is injected into the space between the plates 13 and 14 through the injection pipe 17. In about 15 minutes an insulating film consisting essentially of silicon nitride is, thus, formed on each surface of the wafers with a substantially uniform thickness of about 2,000 A. The variation of the film thickness on the wafer is very small, that is, the ratio of the difference between the maximum thickness and the minimum thickness to the maximum thickness, (Tmax-Tmin)/Tmax, is about 10 percent.

Figure 5A:
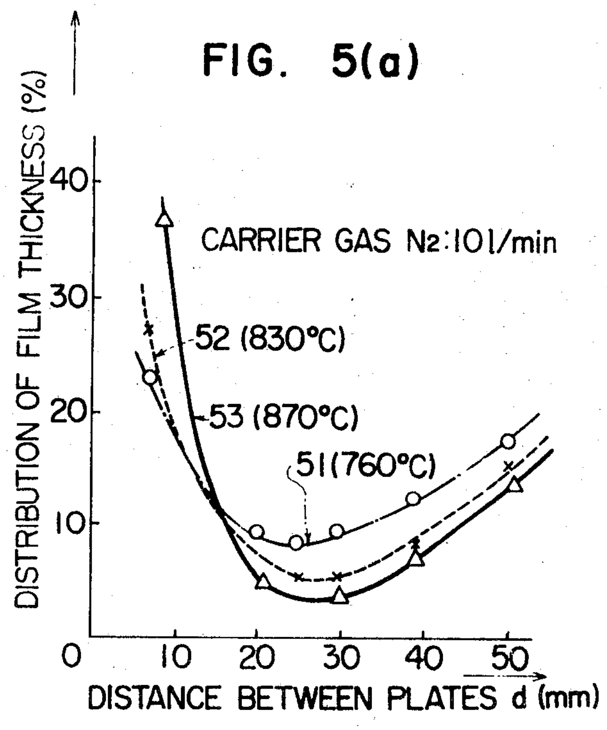
Figure 5B:
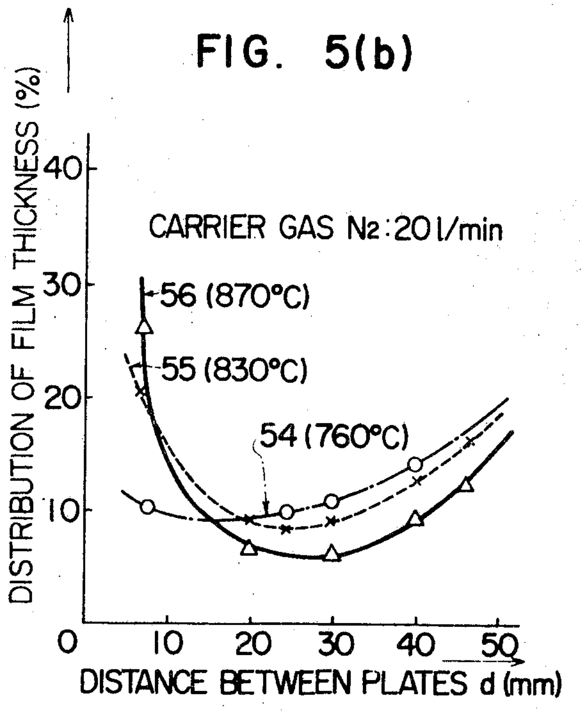
Figure 5C:
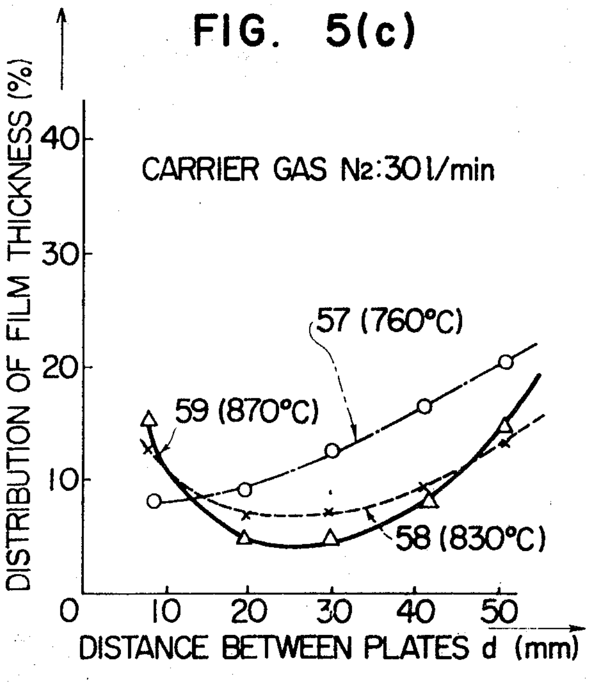

FIGS. 5(*a*), 5(*b*) and 5(*c*) show the characteristic curves for explaining the relationship between the distance between the plates 13 and 14 and the thickness distribution of the silicon nitride film formed on the silicon wafer after about 15 minutes by heating the wafer at a certain elevated temperature and injecting monosilane, $SiH_4$ at a rate of 8 cc./min. and ammonia, $NH_3$ at a rate of 650 cc./min. with nitrogen, $N_2$ in amounts of 10 liters/min., 20 liters/min. and 30 liters/min., respectively.

As clearly understood from FIGS. 5(*a*) and 5(*c*), the thickness distribution of the silicon nitride film remarkably depends on the distance between the plates 13 and 14 and it is desirable that the distance between the plates is selected to a value in the range between 20 and 50 mm. in order to obtain a thickness distribution of the silicon nitride film of not more than 20 percent.

Other modifications of the main parts in the apparatus according to the present invention will be explained in conjunction with FIGS. 2, 3 and 4.

Figure 2:
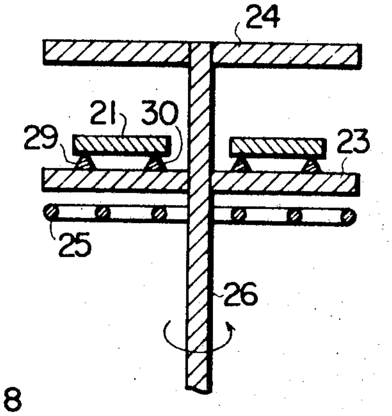
FIGS. 2, 3 and 4 are sectional views of main portions of the apparatus according to several embodiments of the present invention, and FIGS. 5(*a*) to 5(*c*) show characteristic curves for explaining the relationship between the distribution of the film thickness and the distance between two plates.

In FIG. 2 each of the silicon wafers 21 is disposed on the turn table jig or plate 23 through at least three supplemental supporting members 29 and 30 for supporting the wafer in a state of point contact without directly contacting the bottom surface of the wafer to the plate 23. These supplemental supporting members 29 and 30 may be made of quartz, carbon, etc. The wafers are heated not by the heat directly transferred from the plate 23, but by the radiant heat generated from the plates 23 and 24. The temperature of the wafer and the temperature of the vicinity thereof is maintained at a certain constant value. In a specific embodiment, the wafer 21 is spaced from the plate 23 by about 200$\mu$ through the supplemental supporting members 29 and 30 of quartz.

Figure 3:
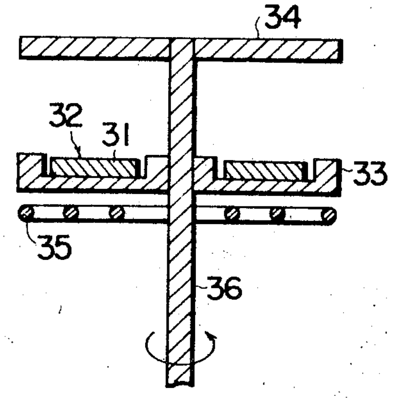

In FIG. 3, each of the wafers 32 is disposed in a ditch 32 provided in the surface of the plate 33, the ditch 32 having a depth not less than the thickness of the wafer. Thus, the wafer is prevented from being dropped down during the rotation of the turn table or plate 33 and the upper edge portion of the wafer is more effectively heated to an elevated temperature by the heat radiated from the inside wall in the ditch of the plate 33.

Figure 4:
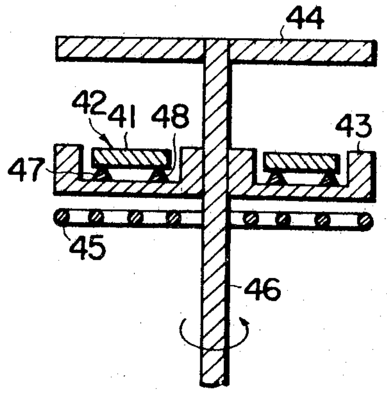

In FIG. 4, each of the wafers 41 is disposed in a ditch 42 provided in the surface of the plate 43 and supported through at least three supplemental supporting members 47 and 38, as explained in FIG. 2. In this specific embodiment, all surfaces of the wafer except the point-contacted portions are not directly in contact with the heated plates 43 and 44, and the wafer is heated to a certain constant value of temperature substantially by the heat radiated from the plates 43 and 44.

As is clear from the above description, according to the present invention, a film forming apparatus wherein a film with even thickness can be obtained by removing the reaction spots caused by the convection of the reaction gas in a bell jar can be provided.

It should be understood that the present invention is not limited to the formation of silicon nitride but also is applicable in any situation where films of an insulating material, metallic material or semiconductor material are formed by chemical gas phase reaction.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. An apparatus for forming a film on a wafer which comprises a container means adapted to be hermetically sealed, a shaft means disposed for rotation in said container means, first and second, substantially coextensive plate means fixed to said shaft means in a spaced-apart relationship, said first plate means adapted to support said wafer and pipe means for introducing a reaction gas directly into the region between said plates.

2. The apparatus of claim 1, wherein the second plate is disposed above the first plate in a substantially parallel relationship with respect to said first plate.

3. The apparatus of claim 2, wherein a heating means is associated with the first plate means for heating the same.

4. The apparatus of claim 1, wherein the first and second plate means are disposed about 2 to 5 centimeters from each other.

5. The apparatus of claim 1, wherein the size of the second plate means is at least the size of the first plate means.

6. The apparatus of claim 1, wherein a plurality of supporting elements are disposed on the first plate means for supporting the wafer in a state of point contact.

7. The apparatus of claim 6, wherein the supporting elements are triangularly shaped.

8. The apparatus of claim 1, wherein the first plate means is provided with at least one hollowed out section which is adapted to contain the wafer.

9. The apparatus of claim 8, wherein the hollowed out section has a depth not less than the thickness of the wafer.

10. The apparatus of claim 1, wherein the first plate means is provided with at least one hollowed out section which is adapted to contain a plurality of supporting elements for supporting the wafer in a state of point contact.

11. The apparatus of claim 1, wherein the container means is a bell jar.

12. The apparatus of claim 3, wherein the heating means is a radio-heated coil associated with the lower portion of the first plate means.

13. An apparatus for reducing thermal convection and for forming a uniform film on a wafer which comprises a container means adapted to be hermetically sealed, a shaft means disposed for rotation in said container means, a first and second turn table plate fixed to said shaft in a spaced-apart, substantially parallel relationship with respect to each other, the second turn table plate being disposed above the first turn table plate and the first turn table plate adapted to support said wafer, a heating means disposed in the container means for heating the first turn table plate to an elevated temperature and an injection pipe introducing a reaction gas directly into the region between said plates.

14. The apparatus of claim 13, wherein the heating means is disposed below the first turn table plate.

15 The apparatus of claim 13, wherein the film comprises silicon nitride and the reaction on gas contains a silicon compound, ammonia and a carrier gas.

* * * * *